Sept. 11, 1962     C. L. HILDEBRAND     3,053,585
METERING PUMP DRIVE ARRANGEMENT
Filed Jan. 27, 1960
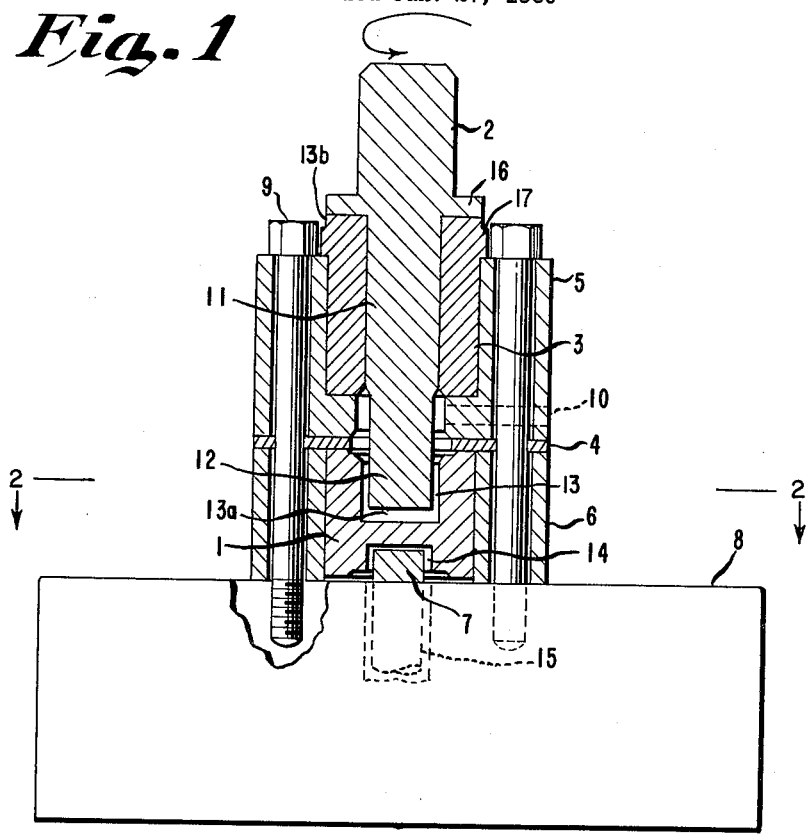
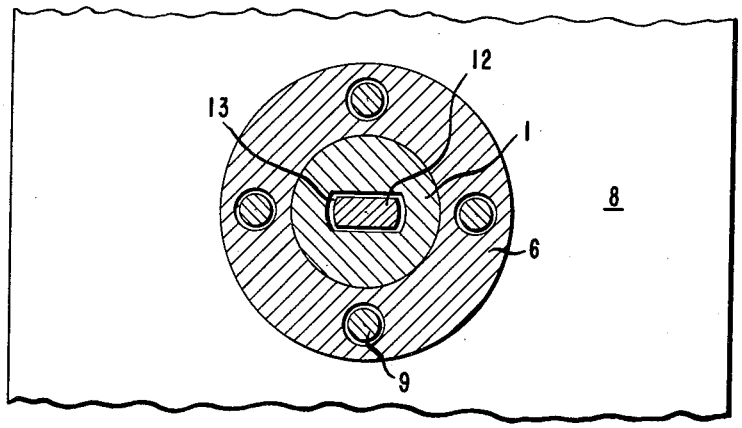
INVENTOR
CLEVELAND L. HILDEBRAND
BY *Frank C. Hilberg*
ATTORNEY

United States Patent Office 3,053,585
Patented Sept. 11, 1962

3,053,585
METERING PUMP DRIVE ARRANGEMENT
Cleveland L. Hildebrand, Seaford, Del., assignor to E. I. du Pont de Nemours and Company, Wilmington, Del., a corporation of Delaware
Filed Jan. 27, 1960, Ser. No. 6,586
6 Claims. (Cl. 308—36.1)

This application is a continuation in part of application Serial No. 681,673, filed September 3, 1957, now abandoned.

This invention relates to an improved apparatus for driving a rotary gear pump, and more particularly to a drive and seal for metering pumps of the gear type which operate under very high pressures.

Metering pumps are frequently driven from a shaft to which they are coupled in a manner allowing easy and quick engagement or disengagement. This may be by the use of keyways, slotted shafts, etc.

Metering pumps as used in the spinning of synthetic fibers and filaments usually handle viscous materials and frequently have to operate at relatively high pressures, e.g., 5,000 lbs./in.$^2$ or greater. This creates a sealing problem around the pump shaft which is not solved by the hubs used on the prior pumps operating at lower pressures. Attempts to use these hubs have resulted in pump failures from leaks at the hubs or from excessive wear on the seals.

It is, therefore, an object of this invention to provide an improved metering pump drive arrangement in which the drive seal is not damaged in use. Another object is to provide an effective drive seal. Still another object is to provide a unit which is readily detachable from the external drive shaft. A still further object is to gain process advantages resulting from the ability to use higher pump discharge pressures. These and other objects will more clearly appear hereinafter.

These objects are realized by my invention which will now be described with reference to the accompanying drawings wherein the legends refer to like parts referred to in the description and wherein:

FIGURE 1 is a side elevation partly in cross section of the pump and the drive seal housing.

FIGURE 2 is a cross sectional view of the housing taken on the line 22 in FIGURE 1.

Referring now to FIGURE 1, the drive seal arrangement is shown in combination with a conventional metering pump 8 such as described, e.g., in U.S. Patent 2,533,320. The pump is provided with a stub drive shaft 7 with preferably two milled flat sides which mates loosely with recess 14 in the drive seal plug 1. The rotation-driving action from a motor or other driving means not shown is imparted to the flanged end 2 of the seal drive shaft 11. This drive shaft 11 is properly aligned in housing 5 by a combination radial and end thrust bearing 3 against which the flange 16 bears. The opposite end of the shaft shown as 12 has milled flat sides which mate loosely with recess 13 in rotatable drive seal plug 1, as shown in FIGURE 2.

The recess is of such depth as to provide a small clearance 13a at its lower end. This clearance between the recess and shaft 12 is of the same magnitude as the distance 13b of the portion of the bearing 3 which extends beyond the flange 17. This clearance is important since it allows for wear on the end of bearing 3 which is in contact with flange 16, and should be from about .05 to .10 inch, preferably about one-sixteenth of an inch. The arrangement shown has the further advantage that the amount of reserve bearing present may be observed by inspection without dismantling the seal.

The action of the drive seal plug 1 is thus independent of external drive shaft forces which could interfere with the sealing action. Drive shaft 7 of the pump is bushed in top plate 8 by tool steel bushing 15.

The entire drive arrangement is housed in a two-part housing 5 and 6 attached to the pump 8 by machine bolts 9. The two parts of the housing 5 and 6 are separated by a shim 4 to provide an appropriate combination sealing and bearing surface for the drive seal plug 1. If desired, a leakage escape port 10 can be included in the design.

The principal advantage of the use of this intermediate drive shaft is that the drive seal 1, being isolated from the direct motor drive, is protected against damage due to possible misalignment, eccentric drive shaft, end thrusts, etc., of the motor pump drive shaft. These forces are absorbed in the bearing 3 and thus allow the seal to concentrate on the sole function of sealing the shaft of the pump as well as shaft end 12 may be of any cross section other than circular so the shaft cannot turn in the recess. The term non-circular may include cross sections that are square, triangular, circular, interrupted by one or two flat portions, or keyways, although a shaft with two flat sides as shown is preferred.

The housing 5 is preferably made of ordinary grey cast iron, and the seal drive plug 1 and housing 6 and drive shaft 2 made of hardened tool steel, e.g., H–11 (A.I.S.I. type classification, low carbon, 5% chromium), while the bearing 3 is preferably made of Graphilloy 211 (graphited metal bearing material commercially available from Graphite Metallizing Corporation). Obviously, other materials can readily be used in the place of those specified. For some purposes the bearings and seals may be of bronze, nylon, etc.

The following example serves to illustrate the advantage gained by the use of this intermediate drive shaft, although its use is not restricted to this example.

EXAMPLE I

Polyhexamethylene adipamide of a number average molecular weight of about 14,000 was spun to 140 filament yarn bundle at the rate of 180 grams per minute per spinning unit, at a pressure of 5000 p.s.i. and a temperature of about 287° C. 432 units with conventional direct pump drive (without intermediate shaft 11 and bearing 3) were operated for a total of 46,172 pump days during which 97 seal plugs, 8 top plates, 508 drive shafts and 278 bushings had to be replaced. This means an average operating life for the different parts as listed in Table I, column A.

During the same interval, 100 pumps with stub shafts and bearings added in accordance with this invention were operated for a total of 16,000 pump days during which 2 seal plugs, 1 top plate, 82 drive shafts and 18 bushings had to be replaced. This means an average operating life for the different parts as listed in Table I, column B. Comparison of columns A and B clearly shows the improvement of this invention by a significant reduction of physical damage to the parts.

Table I
AVERAGE LIFE OF PARTS (IN OPERATING DAYS)
A. Conventional Drive Arrangement
B. Improved Drive Arrangement

|  | A | B |
|---|---|---|
| Seal plugs | 480 | 8,000 |
| Top plates | 5,780 | 16,000 |
| Drive shafts | 91 | 195 |
| Bushings | 166 | 890 |

While the invention has been illustrated in connection with metering pumps for delivering a synthetic polymer to a spinning unit, it is to be understood that the device herein disclosed may be used in connection with any pump used for transferring or supplying fluids under high pressures. It may likewise be used for a seal in low pressure systems but its chief advantage is its ability to seal pumps under very high pressures.

Many widely different embodiments may be made of this invention without departing from the scope and spirit therefrom. Hence, the invention is not to be restricted in any way except as set forth in the following claims.

I claim:

1. A seal for preventing leakage of fluids around a pump shaft which comprises a housing adapted to be fastened securely to a pump and about the shaft of a pump, a rotatable tightly fitting, solid, cylindrical, non-yielding seal plug within the housing, a recess in the said seal plug adapted to receive loosely the shaft of the pump and to transmit a rotary motion thereto, a second recess in the seal plug concentrically disposed with the first said recess in non-contiguous relation, a flange drive shaft set in a bearing within the said housing and extending from .05 to .10 inch outside the housing with the flange against the outer end of the bearing, the innermost end of the said shaft being adapted to rotate the said seal plug and fitting loosely in the said second recess of the seal plug with an end clearance of about .05 to .10 inch.

2. The apparatus of claim 1 which includes means for venting any accumulated fluid near the said bearing.

3. A seal for preventing leakage of fluids around a pump shaft which comprises a rotatable, solid, cylindrical, non-yielding, seal plug which fits tightly within a housing, a recess within the seal plug adapted to receive loosely the shaft of the pump and to rotate it, a second recess in the plug concentrically and in non-contiguous relation with the first said recess, a flanged drive shaft, one end of which is disposed loosely within the said second recess and adapted to rotate the said plug, a bearing within the housing for the said shaft, the said bearing extending a slight distance beyond the housing and having a terminal clearance between the shaft and bottom of the second recess equal to the said slight distance.

4. The apparatus of claim 3 in which the shaft is provided with a flange which bears against the said bearing.

5. The apparatus of claim 3 which includes means for venting any accumulated fluid near the said bearing.

6. A seal for preventing a leakage of fluids around a pump shaft which comprises a two-piece housing and a shim therebetween to provide a sealing and bearing surface; bolts passing longitudinally through the housing near the periphery thereof for securing it to the face of the pump; a rotatable, non-yielding, solid, cylindrical plug fitting tightly within the piece of the said housing next to the pump and bearing against the said shim; a recess in the said plug for accepting loosely the shaft of the pump said shaft being rotatably driven by the plug; a concentric flanged drive shaft in the other face of the said housing set in a bearing which extends a slight distance outward from the housing and also extends through the said shim and loosely into a second recess in the said seal plug for rotating it; the said second recess being concentric with and in non-communicating relation with the said first recess in the seal plug whereby any liquid leaking around the pump shaft passes outwardly from the shaft to the periphery of the said plug along its length and inwardly between the tightly fitting plug and shim, the bottom of the said recess having a terminal clearance with the flanged shaft substantially equal to the said slight distance.

References Cited in the file of this patent

UNITED STATES PATENTS

| | | |
|---|---|---|
| 2,105,428 | Maglott | Jan. 11, 1938 |
| 2,488,769 | Engstrom | Nov. 22, 1949 |